US010944124B2

(12) United States Patent
Turon Teixidor et al.

(10) Patent No.: US 10,944,124 B2
(45) Date of Patent: *Mar. 9, 2021

(54) CLAMPING DEVICE FOR AN ELECTROCHEMICAL CELL STACK

(71) Applicant: Enevate Corporation, Irvine, CA (US)

(72) Inventors: Genis Turon Teixidor, Upland, CA (US); Stephen W. Schank, Howell, MI (US); Benjamin Yong Park, Mission Viejo, CA (US); Rabih Bachir Zaouk, Los Angeles, CA (US)

(73) Assignee: Enevate Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/895,627

(22) Filed: Jun. 8, 2020

(65) Prior Publication Data

US 2020/0303762 A1    Sep. 24, 2020

Related U.S. Application Data

(63) Continuation of application No. 15/443,192, filed on Feb. 27, 2017, now Pat. No. 10,680,274, which is a
(Continued)

(51) Int. Cl.
*H01M 10/04* (2006.01)
*H01M 10/44* (2006.01)
(Continued)

(52) U.S. Cl.
CPC ..... *H01M 10/0481* (2013.01); *H01M 2/1061* (2013.01); *H01M 2/1077* (2013.01);
(Continued)

(58) Field of Classification Search
CPC .................................................. H01M 10/0481
(Continued)

(56) References Cited

U.S. PATENT DOCUMENTS 5,114,804 A * 5/1992 Stiles ............... H01M 10/42
429/66
5,409,787 A   4/1995 Blanyer
(Continued)

FOREIGN PATENT DOCUMENTS

EP    1 071 151    1/2001
JP       183045    7/1995
(Continued)

OTHER PUBLICATIONS

Search Report and Written Opinion for International Application No. PCT/US2014/020026 dated Jun. 3, 2014 in 10 Pages.
(Continued)

*Primary Examiner* — Jerry D Robbins
(74) *Attorney, Agent, or Firm* — McAndrews, Held & Malloy

(57) ABSTRACT

A clamping device for an electrochemical cell stack is provided. The clamping device can include a first plate and a second plate. The second plate can be positionable relative to the first plate such that a space between the first plate and the second plate can be sized to receive an electrochemical cell stack. The device also can include a coupling member coupling the first plate to the second plate. At least one of the first and second plates can be movable away from the other plate. The coupling member can have a first end portion and a second end portion. The device further can include an elastic member disposed between the first end portion and the second end portion.

13 Claims, 6 Drawing Sheets

Related U.S. Application Data continuation of application No. 14/195,368, filed on Mar. 3, 2014, now Pat. No. 9,620,809.

(60) Provisional application No. 61/785,728, filed on Mar. 14, 2013.

(51) Int. Cl.
   *H01M 2/10* (2006.01)
   *H01M 4/134* (2010.01)
   *H01M 10/0525* (2010.01)
   *H01M 10/058* (2010.01)

(52) U.S. Cl.
   CPC ....... *H01M 4/134* (2013.01); *H01M 10/0468* (2013.01); *H01M 10/058* (2013.01); *H01M 10/0525* (2013.01); *H01M 10/441* (2013.01); *H01M 10/446* (2013.01); *Y02E 60/10* (2013.01); *Y10T 29/49108* (2015.01)

(58) Field of Classification Search
   USPC ......................................................... 320/137
   See application file for complete search history.

(56) References Cited

U.S. PATENT DOCUMENTS

| | | |
|---|---|---|
| 5,484,666 A | 1/1996 | Gibb |
| 5,916,515 A | 6/1999 | Bryan |
| 6,376,126 B1 | 4/2002 | Faust |
| 7,037,618 B2 | 5/2006 | Andrews |
| 7,586,288 B2 * | 9/2009 | Onishi .................. H01M 10/46 320/107 |
| 7,897,290 B2 | 3/2011 | Thanner |
| 8,012,648 B2 | 9/2011 | Bogumil |
| 8,435,679 B2 | 5/2013 | Lamanna |
| 8,557,477 B2 | 10/2013 | Chen |
| 8,603,683 B2 | 12/2013 | Park et al. |
| 8,939,441 B2 * | 1/2015 | Kim ...................... H02J 7/0042 269/67 |
| 9,178,208 B2 | 11/2015 | Park et al. |
| 9,203,092 B2 | 12/2015 | Slocum |
| 9,368,830 B2 | 6/2016 | Hwang |
| 9,397,338 B2 | 7/2016 | Park et al. |
| 9,553,303 B2 | 1/2017 | Park et al. |
| 9,583,757 B2 | 2/2017 | Park et al. |
| 9,620,809 B2 | 4/2017 | Turon Teixidor et al. |
| 9,647,259 B2 | 5/2017 | Park et al. |
| 9,806,328 B2 | 10/2017 | Park et al. |
| 9,941,509 B2 | 4/2018 | Park et al. |
| 9,997,765 B2 | 6/2018 | Park |
| 10,103,378 B2 | 10/2018 | Park et al. |
| 10,388,943 B2 | 8/2019 | Bonhomme et al. |
| 10,431,808 B2 | 10/2019 | Park et al. |
| 10,461,366 B1 | 10/2019 | Anderson et al. |
| 2003/0017387 A1 * | 1/2003 | Marukawa .......... H01M 2/1077 429/156 |
| 2005/0079407 A1 * | 4/2005 | Higashino ........... H01M 2/1061 429/66 |
| 2010/0255376 A1 | 10/2010 | Park et al. |
| 2011/0020701 A1 | 1/2011 | Park et al. |
| 2011/0177377 A1 | 7/2011 | Dube |
| 2011/0177393 A1 | 7/2011 | Park |
| 2011/0274989 A1 | 11/2011 | Lu |
| 2012/0009506 A1 | 1/2012 | Tanahashi |
| 2012/0139496 A1 | 6/2012 | Krishnan |
| 2014/0170498 A1 | 6/2014 | Park |
| 2014/0295290 A1 | 10/2014 | Park et al. |
| 2017/0040598 A1 | 2/2017 | Wang et al. |
| 2017/0133664 A1 | 5/2017 | Park et al. |
| 2017/0133665 A1 | 5/2017 | Park et al. |
| 2017/0133670 A1 | 5/2017 | Park et al. |
| 2017/0155126 A1 | 6/2017 | Park et al. |
| 2017/0279093 A1 | 9/2017 | Park |
| 2018/0062154 A1 | 3/2018 | Park et al. |
| 2018/0198114 A1 | 7/2018 | Bonhomme et al. |
| 2018/0219211 A1 | 8/2018 | Park et al. |
| 2018/0226642 A1 | 8/2018 | Wang et al. |
| 2018/0287129 A1 | 10/2018 | Park |
| 2019/0178944 A1 | 6/2019 | Rango et al. |
| 2019/0181426 A1 | 6/2019 | Park et al. |
| 2019/0181431 A1 | 6/2019 | Canton |
| 2019/0181434 A1 | 6/2019 | Lee et al. |
| 2019/0181440 A1 | 6/2019 | Park et al. |
| 2019/0181441 A1 | 6/2019 | Ji et al. |
| 2019/0181491 A1 | 6/2019 | Park et al. |
| 2019/0181492 A1 | 6/2019 | Liu et al. |
| 2019/0181500 A1 | 6/2019 | Ji et al. |
| 2019/0181501 A1 | 6/2019 | Ji et al. |
| 2019/0181502 A1 | 6/2019 | Ji et al. |
| 2019/0190069 A1 | 6/2019 | Ji et al. |
| 2019/0190070 A1 | 6/2019 | Ji et al. |
| 2019/0355966 A1 | 11/2019 | Kamath et al. |
| 2019/0372088 A1 | 12/2019 | Bonhomme et al. |

FOREIGN PATENT DOCUMENTS

| | | |
|---|---|---|
| JP | 252831 | 9/2006 |
| JP | 202534743 | 11/2012 |
| WO | 2011-065908 | 3/2011 |
| WO | 2014/158768 | 10/2014 |

OTHER PUBLICATIONS

Ma et al., "Si-Based Anode Materials for Li-Ion Batteries: A Mini Review", Nano-Micro Letters 2014, vol. 6, No. 4, pp. 347-358.

International Preliminary Report on Patentability and Written Opinion for International Application PCT/US2014/020026, dated Sep. 15, 2015 in 6 Pages.

* cited by examiner

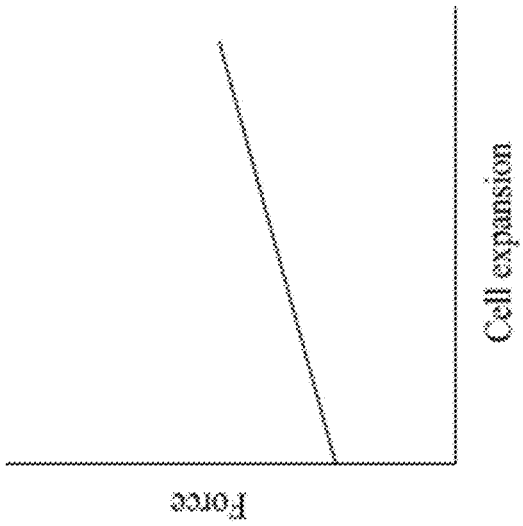
FIG. 3A
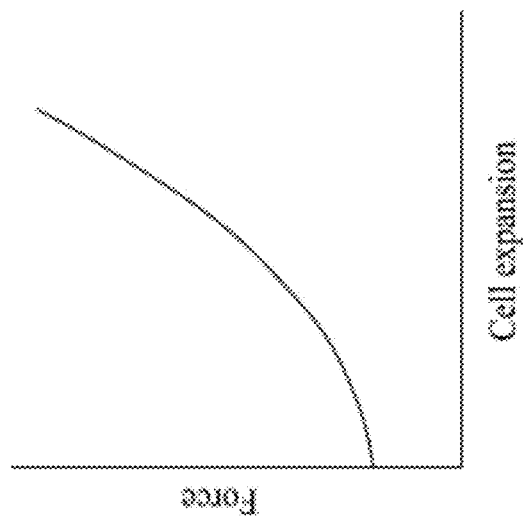
FIG. 3B
FIG. 3A-3B

CLAMPING DEVICE FOR AN ELECTROCHEMICAL CELL STACK

CROSS-REFERENCE TO RELATED APPLICATIONS

This application is a continuation of U.S. patent application Ser. No. 15/443,192 filed on Feb. 27, 2017, now U.S. Pat. No. 10,680,274, which is a continuation of U.S. patent application Ser. No. 14/195,368, filed Mar. 3, 2014, now U.S. Pat. No. 9,620,809, which claims the benefit of U.S. Provisional Patent Application No. 61/785,728, filed on Mar. 14, 2013. Each of the above referenced applications is hereby incorporated herein by reference in its entirety.

BACKGROUND

Field

The present disclosure relates generally to clamping devices. In particular, the present disclosure relates to clamping devices for electrochemical cell stacks.

Description of the Related Art

A lithium ion battery typically includes a separator and/or electrolyte between an anode and a cathode. In some of batteries, the separator, cathode and anode materials are individually formed into sheets or films. Sheets of the cathode, separator and anode are subsequently stacked or rolled with the separator separating the cathode and anode (e.g., electrodes) to form the battery. For the cathode, separator and anode to be rolled, each sheet must be sufficiently deformable or flexible to be rolled without failures, such as cracks, brakes, mechanical failures, etc. Typical electrodes include electrochemically active material layers on electrically conductive metals (e.g., aluminum and copper). For example, carbon can be deposited onto a current collector (e.g., a copper sheet) along with an inactive binder material. Carbon is often used because it has excellent electrochemical properties and is also electrically conductive. Electrodes can be rolled or cut into pieces which are then layered into stacks. The stacks are of alternating electrochemically active materials with the separator between them.

In order to increase the volumetric and gravimetric energy densities of lithium-ion batteries, silicon has been proposed as the active material for the negative electrode. However, during cycling, silicon particles in the anode active material expand upon charging. This expansion can deform the metal foil used as current collectors. Since the layers of the cell stack are confined in a tight region, the expansion can result in warping or deformation of the metal foil, thus reducing the contact area between layers in the battery stack. As a result, the ability of a battery to accept and release electrical charge may be severely affected. Thus, preventing the electrode from deformation could serve to reduce the irreversible capacity and improve cycle life.

SUMMARY

In certain embodiments, a clamping device for an electrochemical cell stack is provided. The clamping device can include a first plate and a second plate positionable relative to the first plate such that a space between the first plate and the second plate is sized to receive an electrochemical cell stack. The clamping device can also include a coupling member coupling the first plate to the second plate. At least one of the first and second plates can be movable away from the other plate. The coupling member also can have a first end portion and a second end portion. Furthermore, the clamping device can include an elastic member disposed between the first end portion and the second end portion.

In some embodiments, the variation of the distance between the first and second plates correlates with the expansion of the electrochemical cell stack. At least one of the end portions of the coupling member can be configured to set an applied pressure on the electrochemical cell stack. The clamping device can also be configured to reduce deformation of an electrode in the electrochemical cell stack upon charging. In addition, the elastic member can be configured to be compressed during the charging of the electrochemical cell stack, thereby reducing the increase in pressure on the electrochemical cell stack exerted by the first and second plates. Reducing the increase in pressure can result in a substantially constant pressure on the electrochemical cell stack.

In some embodiments, the elastic member is configured to be compressed during the charging of the electrochemical cell stack, thereby reducing variations in pressure on the electrochemical cell stack due to the expansion of the electrochemical cell stack. The elastic member can comprise a spring, a plunger, an elastic band, a pneumatic piston, or foam. The coupling member can comprise a fastener, a spring clamp, or a C-clamp. At least one of the first or second end portions can comprise a plurality of nuts or a plurality of fastener heads.

In further embodiments, a method of reducing deformation of an electrode in an electrochemical cell stack is provided. The method includes positioning the electrochemical cell stack between the first and second plates; and adjusting the end portion of the coupling member to set an applied pressure on the electrochemical cell stack.

In some embodiments, the method can include charging the electrochemical cell stack. Also, the electrochemical cell stack can be positioned between the first and second plates prior to charging the electrochemical cell stack for the first time. The method can further include removing the electrochemical cell stack after cell formation or cell pretreatment.

BRIEF DESCRIPTION OF THE DRAWINGS

FIG. 3A is a plot of the force on an electrochemical cell stack as a function of cell expansion of an electrochemical cell stack placed in a fixed-gap clamping device;

FIG. 3B is a plot of the force on an electrochemical cell stack as a function of cell expansion of an electrochemical cell stack placed in a clamping device of certain embodiments described herein;

DETAILED DESCRIPTION

Figure 1:
FIG. 1 is a photograph of an example clamping device for an electrochemical cell stack in accordance with certain embodiments described herein.

Anode electrodes currently used in the rechargeable lithium-ion cells typically have a specific capacity of approximately 200 milliamp hours per gram (including the metal foil current collector, conductive additives, and binder material). Graphite, the active material used in most lithium ion battery anodes, has a theoretical energy density of 372 milliamp hours per gram (mAh/g). In comparison, silicon has a high theoretical capacity of 4200 mAh/g. Silicon, however, swells in excess of 300% upon lithium insertion. Because of this expansion, anodes including silicon should be allowed to expand while maintaining electrical contact between the silicon particles. However, as an electrochemical cell stack expands, the expansion can be non-uniform, resulting in thickness variation in the cell stack and deformation.

This disclosure describes certain embodiments of a clamping device for an electrochemical cell stack configured to reduce deformation of an electrode that expands in a cell stack upon charging. The cell stacks can include graphite, silicon-based, tin-based or other alloy-based electrodes. For example, the clamping device can comprise a first plate and a second plate. The second plate can be positionable relative to the first plate such that a space between the first plate and the second plate is sized to receive an electrochemical cell stack. The clamping device also can comprise a coupling member coupling the first plate to the second plate. At least one of the first and second plates can be movable away from the other plate. For example, at least one of the first and second plates can be movable about the coupling member.

If at least one of the first and second plates were not movable away from the other plate, the first and second plates can exert an increasing pressure onto the cell stack upon expansion of the cell stack during charging. Left uncontrolled, if a high enough pressure is reached, the cell stack could be damaged, e.g., shorting of the cell stack. However, in certain embodiments, because at least one of the first and second plates can be movable away from the other plate, some of the pressure exerted by the first and second plates onto the cell stack can be relieved and also controlled.

For example, in some embodiments, only one of the first and the second plates is movable as the cell stack expands. In other embodiments, both plates are movable as the cell stack expands. The variation of the distance between the first and second plates can correlate with the expansion of the cell stack.

In some embodiments, the coupling member can have a first end portion and a second end portion. The clamping device can further include an elastic member disposed between the first end portion and the second end portion. At least one of the end portions of the coupling member can be configured to set an applied pressure on the cell stack. For example, the elastic member can be configured to be compressed during the charging of the cell stack. As the elastic member is compressed, the increase in pressure on the cell stack exerted by the first and second plates can be reduced. In some instances, the reduced increase in pressure by the first and second plates can result in a slight variation in pressure (or a substantially constant pressure) on the cell stack, and thereby reducing the thickness variation and/or deformation of the cell stack due to non-uniform expansion.

As described herein, certain embodiments of the clamping device can include a first plate and a second plate. In some embodiments, the first plate can be made of substantially the same material as that of the second plate. In other embodiments, the first plate can be made of different material than that of the second plate. The materials can include metal (e.g., carbon steel or aluminum) and/or a polymer (e.g., polypropylene or an epoxy). The materials can also include an insulating material. The cross-sectional shape of at least one of the first and second plates can be square, rectangular, circular, ovular, or polygonal (e.g., pentagonal, hexagonal, octagonal, etc.). The second plate can be positionable relative to the first plate such that there is a space between the first and second plates. Because the space can be sized to receive an electrochemical cell stack, the dimensions of the first and second plates can be sized and shaped so as to be able to house a cell stack between the first and second plates. Thus, the dimensions of the first and second plates can depend on the size and shape of the cell stack. Furthermore, the thicknesses of the first and second plates can be sized to reduce bending of the first and second plates upon charging of the cell stack. For example, the thicknesses of the first and second plates can be between about 0.5 cm and about 0.8 cm, e.g., about 0.6 cm, about 0.65 cm, or about 0.7 cm. In some embodiments, the shape and dimensions of the first plate can be substantially the same as the shape and dimensions of the second plate. In other embodiments, the shape and dimensions of the first plate can be different than the shape and dimensions of the second plate.

In some embodiments, the space between the first and second plates can be sized to receive more than one cell stack. For example, a plurality of cell stacks can be placed side by side or stacked on top of each other between the first and second plates. In such embodiments, multiple cell stacks can utilize the same clamping device (e.g., the same elastic member to maintain similar or substantially the same set pressures on the cell stacks). Furthermore, the clamping device can also include more than the first and second plates, e.g., multiple plates stacked on top of each other. The space between two plates can be sized to each receive at least one cell stack. In such embodiments, several cell stacks can also utilize the same elastic member. Thus, a plurality of cell stacks can be placed between the first and second plates with or without additional plates and/or spacers.

In some embodiments, the coupling member extends through a bore in the first plate and/or the second plate. For example, the coupling member can be any extending structure having a longitudinal length capable of coupling the first and second plates. In some embodiments, the coupling member is fixed or seated in the first or the second plate. For example, the coupling member may be a post/rod with one end fixed in the first or the second plate, or the coupling member may be a screw or a post with a threaded portion screwed directly into the first or the second plate. In other embodiments, the coupling member extends through a first bore in the first plate and a second bore in the second plate. In some embodiments, the coupling member may be a fastener such as a screw, a bolt, or a rod/post. In some embodiments, the rod/post may or may not comprise a threaded portion or a textured portion. In other embodiments, the coupling member may comprise a clamp, e.g., a C-clamp. In some embodiments, the clamping device may comprise one or more coupling members.

In some embodiments, the first and the second end portions are independently a nut, a head (e.g., a screw head, a bolt head, or equivalent), a post clamp, a plate (e.g., the first or second plate, or an additional third plate), or part of a C-clamp. The end portions are also configured to prevent the movable plate(s) from being decoupled from the coupling member. In some embodiments, the end portions are configured to set an applied pressure on the cell stack between the first and the second plates. For example, the set pressure can take into consideration, e.g., help compensate for, the non-uniform thickness variation of the cell stack. In embodiments where a plurality of coupling members are used, the pressure set by one coupling member can be different than the pressure set by another coupling member.

The clamping device further can comprise an elastic member disposed between the first end portion and the second end portion. The elastic member may be disposed between the first plate and the first end portion, between the second plate and the second end portion, or between the first plate and the second plate. The elastic member can have a spring constant, and may be an expansion member or a compression member. In some embodiments where the elastic member is disposed between the first plate and the first end portion and/or between the second plate and the second end portion, the elastic member may be a compression member, which is configured to push the first or the second plates away from the first or the second end portion, respectively. In some embodiments where the elastic member is disposed between the first and the second plates, the elastic member may be an expansion member, which is configured to pull the first and the second plates toward each other or exert force on the two plates to cause the plates to be pushed toward each other. In some embodiments, the elastic member may comprise a spring (including expansion spring and compression spring), a plunger, an elastic band, a pneumatic piston, or foam. In some embodiments, the elastic band (e.g., a rubber band) can be disposed around the first and second plates. The elastic band can be configured to allow the at least one of the first and second plates to move away from the other plate upon expansion of the electrochemical cell stack. At least one of the first or second plates can be configured to compress the elastic band to set an applied pressure on the cell stack.

In another embodiment, the end portions can include parts of a C-clamp holding two plates at a fixed distance relative to each other. A third plate and an elastic member can be inserted in between the two fixed plates.

Figure 2:
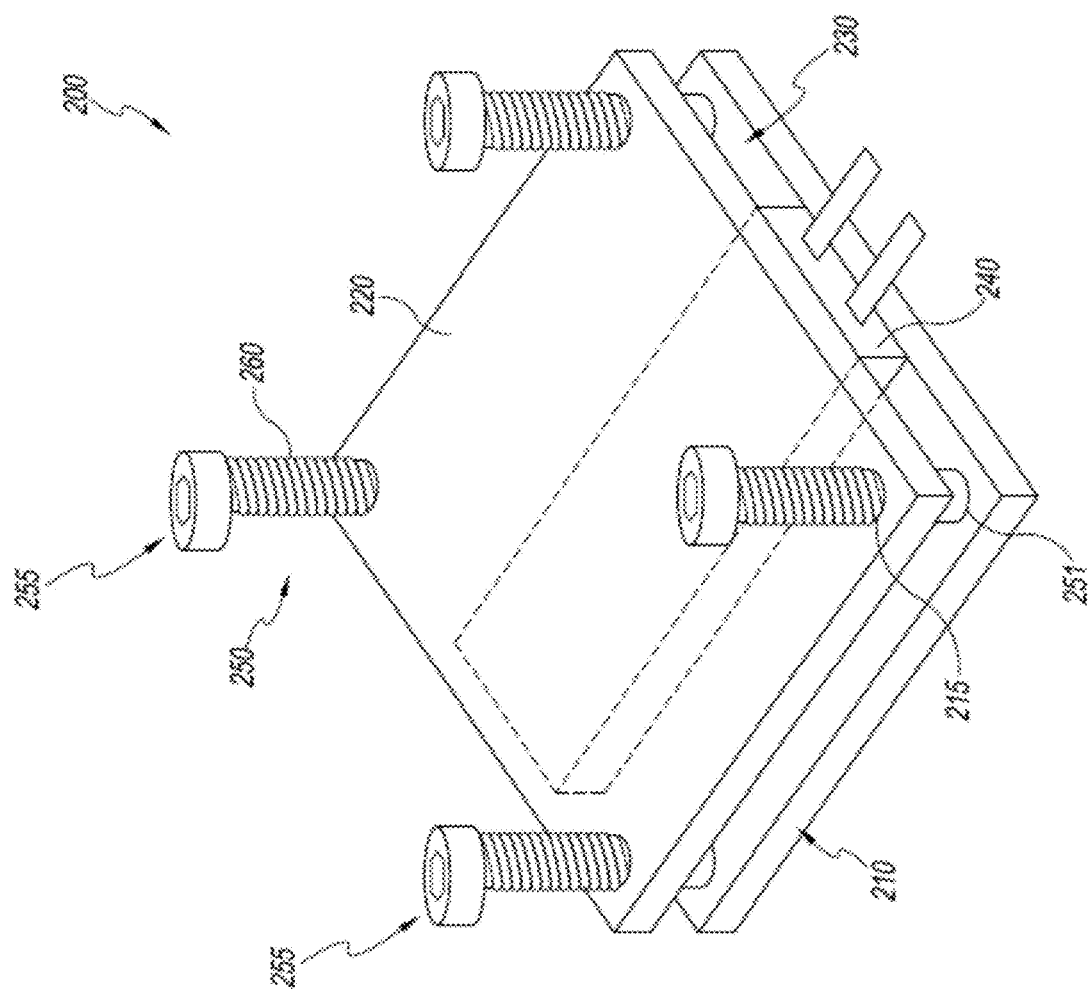
FIG. 2 is a schematic of the example clamping device shown in FIG. 1.

FIG. 1 is a photograph of an example clamping device in accordance with certain embodiments described herein. FIG. 2 is a schematic of the example clamping device shown in FIG. 1 that can be used to confine and exert pressure on the cell stack during cycling. The clamping device 200 can include a first plate 210 and a second plate 220. The second plate 220 can be positionable relative to the first plate 210 such that a space 230 between the first plate 210 and the second plate 220 is sized to receive an electrochemical cell stack 240. The clamping device 200 can also include a coupling member 250 (e.g., a threaded bolt) coupling the first plate 210 to the second plate 220. At least one of the first 210 and second 220 plates can be movable away from the other plate. For example, the second plate 220 can move upward along the coupling member 250 as the cell stack 240 expands. In some embodiments, the first plate 210 may also be movable about the coupling member 250. For example, the first plate 210 may move downward along the coupling member 250 as the cell stack 240 expands.

The coupling member 250 can have a first end portion (on an end portion opposite to 255) and a second end portion 255 (e.g., a bolt head). The clamping device 200 can further include an elastic member 260 (e.g., a spring) disposed between the first end portion and the second end portion 255. As the cell stack 240 within the clamping device 200 expands on cycling, the elastic member 260 can allow the second plate 220 to move along the coupling member 250 to a distance relative to the first plate 210. The variation of the distance between the first plate 210 and the second plate 220 can correlate with the expansion of the cell stack 240.

The second end portion 255 of the clamping device 200 can be configured to compress the elastic member 260. Thus, the second end portion 255 of the coupling member 250 can be configured to set an applied pressure on the cell stack 240, e.g., by tightening or loosening the bolt head. In the example clamping device 200 shown in FIG. 2, the coupling member 250 comprises four bolts 255. Each bolt 255 can be tightened or loosened independently. Thus, each elastic member 260 can be compressed independently to set an applied pressure on the cell stack 240, e.g., to reduce the increase in the applied pressure on the cell stack 240 exerted by the first 210 and second plates 220 and/or to reduce variations in pressure on the cell stack 240 due to the expansion of the cell stack 240.

Figure 5:
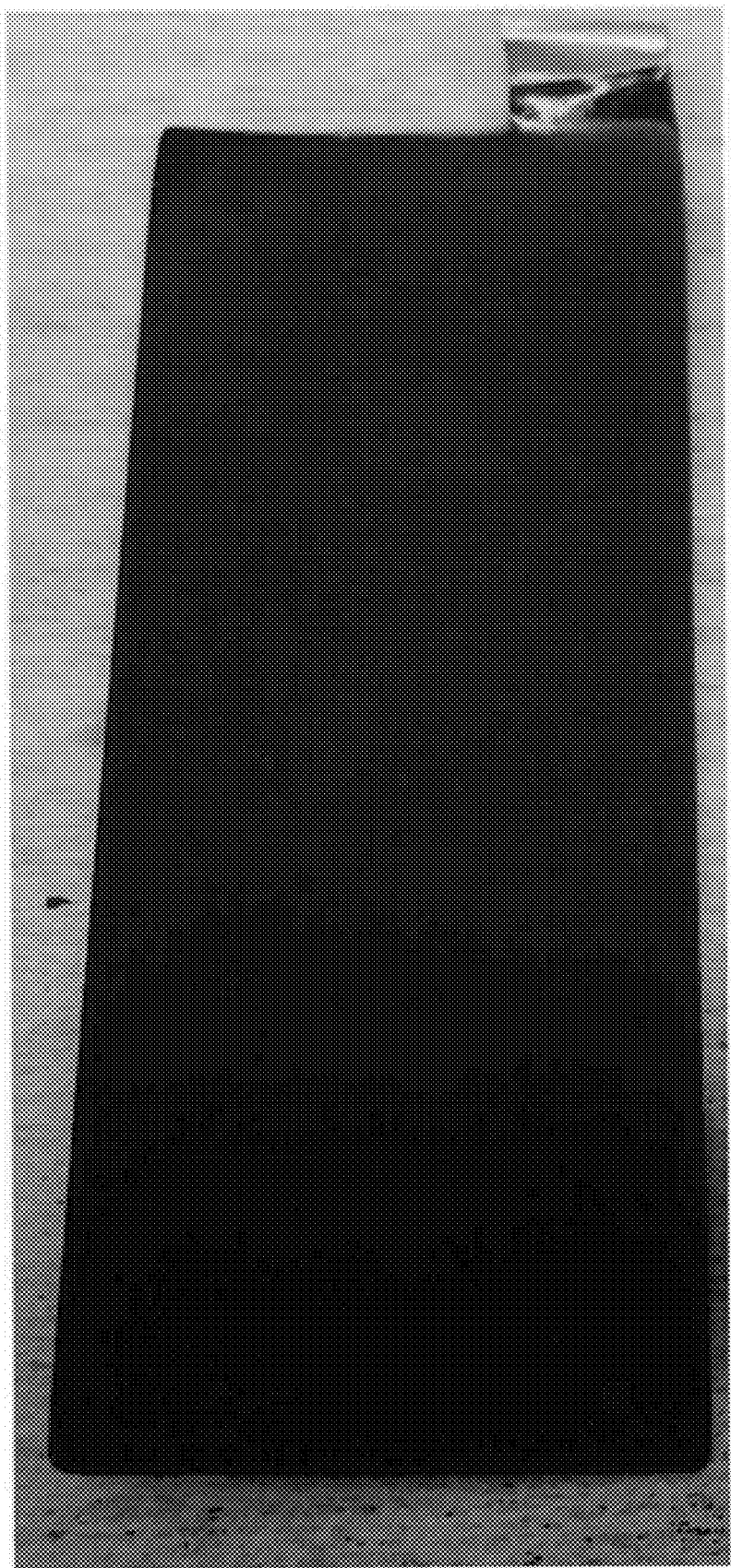
FIG. 5 is a photograph of a non-warped anode of a electrochemical cell stack placed in a clamping device of certain embodiments described herein.

By applying a pressure that considers the thickness variations upon expansion, more consistent electrochemical behavior can result. In some embodiments, the variations in pressure can be reduced so that the applied pressure slightly varies or is substantially constant. FIG. 5 is a photograph of a non-warped anode in an electrochemical cell stack placed in a clamping device of certain embodiments described herein.

In various embodiments, as shown in the example embodiment of FIG. 2, the coupling member 250 can include a plurality of coupling members. For example, the coupling member 250 includes four threaded bolts 251 extending through bores 215 within the corners of at least the second plate 220. The first plate 210 may be threaded and the coupling members 250 may thread directly into the first plate 210. In some embodiments, bolts may be disposed below the first plate 210. The first plate 210 may be movable on the coupling member 250. As described herein, other coupling members 250 can be contemplated.

Furthermore, although the clamping device 200 shown in FIGS. 1 and 2 includes four separate coupling members 250 disposed in the corners of the first 210 and extending through the bores in the second 220 plates, the coupling member 250 can include less than four (e.g., three, two, or one) coupling members or more than four (e.g., five, six, seven, eight, etc.) coupling members disposed about any location of the first 210 and second 220 plates (e.g., not necessarily in the corners). As an example, there could be additional coupling members 250 disposed along one or more edges of the first 210 and second 220 plates in addition to or instead of within the corners of the first 210 and second 220 plates. In other embodiments, there could be fewer than four coupling members 250, e.g., two coupling members 250 disposed on opposite sides from each other. In some such embodiments, the coupling members 250 may have a dimension (e.g., a width or a major axis) that is substantially similar to a dimension (e.g., a length) of the first 210 and second 220 plates. Various configurations are possible.

FIGS. 1 and 2 illustrate an elastic member 260 comprising a plurality of springs. The springs are disposed between the first and second end portions. In this example, the springs are also disposed between the second end portion 255 (e.g., bolt heads) and the second plate 220. As the cell stack 240 within the clamping device 200 expands during cycling, the springs can allow the second plate 220 to move a distance (e.g., correlating to the expansion of the cell stack 240) along the coupling members 250 (e.g., bolts). The bolt heads can be configured to compress the springs. For example, the force load on the springs can be adjusted to set an applied pressure on the cell stack 240 by tightening or loosening the bolt heads. In some embodiments, the bolt heads can be tightened until the springs reach a desired length, which can correlate to an applied pressure on the cell stack 240. By compressing the elastic member 260, the position of the second plate 220 relative to the first plate 210 can also be adjusted. In certain embodiments, the applied pressure can be different for two or more coupling members 250. Also, the adjusted position of the second plate 220 relative to the first plate 210 need not be in the same position prior to expansion. In some embodiments, the length of each spring, for example, can be measured with calipers to increase consistency.

As described herein, the increase in pressure on the cell stack 240 exerted by the first 210 and second 220 plates can be reduced. In some embodiments, the reduced increase in pressure can result in applied pressure on the cell stack 240 that varies slightly or that is substantially constant. In some embodiments, if the applied pressure is too high (e.g., greater than about 400 psi), the electrolyte may be squeezed out of the cell stack 240. Additional damage can also occur to the components of the cell stack 240, including shorting of the cell stack 240. Conversely, in some embodiments, if the applied pressure is too low (e.g., less than a pressure between about 10 and 40 psi for certain pouch cells), the warping of the current collector may not be contained and the electrode foils of the current collector may deform. In various embodiments, the applied pressure on the cell stack 240 can be between about 10 psi and about 400 psi, between about 20 psi and about 400 psi, between about 30 psi and about 400 psi, between about 40 psi and about 300 psi, between about 50 psi and about 300 psi, between about 60 psi and about 300 psi, between about 70 psi and about 300 psi, between about 80 psi and about 300 psi, between about 90 psi and about 300 psi, or between about 100 psi and about 200 psi.

The clamping device 200 in accordance with certain embodiments can also include an interfacial material (not shown) between the first 210 and second 220 plates. For example, the interfacial material can be placed between the cell stack 240 and at least one of the first 210 and second 220 plates. The interfacial material can conform to the surface of the cell stack 240 and can be made of polyethylene sheet, polypropylene sheet, PTFE sheet, paper, paperboard, natural rubber, silicone rubber, foam, or felt. The interfacial material can help spread the pressure more evenly. In addition, the interfacial material can reduce and/or substantially eliminate damage caused by the force of the elastic member 260 compressing on the thickest portion of the cell stack 240. This interfacial material may also allow additional adjustment to account for the cell thickness variation which results in non-uniform pressure during cycling.

The advantage of the clamping device that allows for applied pressure adjustment (i.e., adjustable clamping device) can be seen by comparing the electrochemical cells that were cycled in the adjustable clamping devices with the cells that were cycled in fix-gap clamping devices. When a fix-gap clamping device is used, the cell stack is confined in a fixed space. As the cell stack expands during cycling, the force/pressure exerted on the cell stack would quickly increase with increasing expansion. Expansion during cycling is typically not uniform, resulting in a thickness variation of the cell stack, which may result in non-uniform pressure exerted on the cell stack. For example, a group of cells cycling with a fixed-gap clamping device had a standard deviation of about 12% of their discharge capacity, while a group of cells cycling with a clamping device 200 in accordance with certain embodiments described herein had a standard deviation of about 3% of their discharge capacity.

The force (thus, applied pressure) on the cells as a function of cell expansion during the cycling in an adjustable clamp can be compared to cycling in a fix-gap clamp. FIG. 3A is a plot of the force on an electrochemical cell stack as a function of the cell expansion in a fixed gap clamping device. As shown in FIG. 3A, as the cell stack expands during charging, the force (and thus, pressure) exerted on the cell stack by the clamping device increases quickly (varies significantly) upon expansion. In the exemplified embodiment, the force increase is not linear, but substantially exponential. The high pressure on portions of the cell can damage the cell, likely causing failures such as shorting and/or rupture of the cell.

FIG. 3B shows a plot of the force on an electrochemical cell stack as a function of the cell expansion in an adjustable clamping device. As the cell expands during charging, the increase of the force exerted on the cell stack is much slower (slightly varies) compared to that of the cell in a fix-gap clamping device. In some embodiments, the increase in the force is substantially linear, but with a low slope. In other embodiments, the force on the cell stack could be substantially constant during cell expansion.

As described herein, reducing the increase in applied pressure on the cell stack 240 by two plates can result in an applied pressure on the cell stack 240 that considers the thickness variation of the cell stack 240 upon expansion. In some instances, the increase in applied pressure on the cell stack 240 can be reduced such that the applied pressure slightly varies or becomes substantially constant upon cell expansion. Reductions in the increase in applied pressure can result in a more consistent electrochemical behavior.

Figure 4:
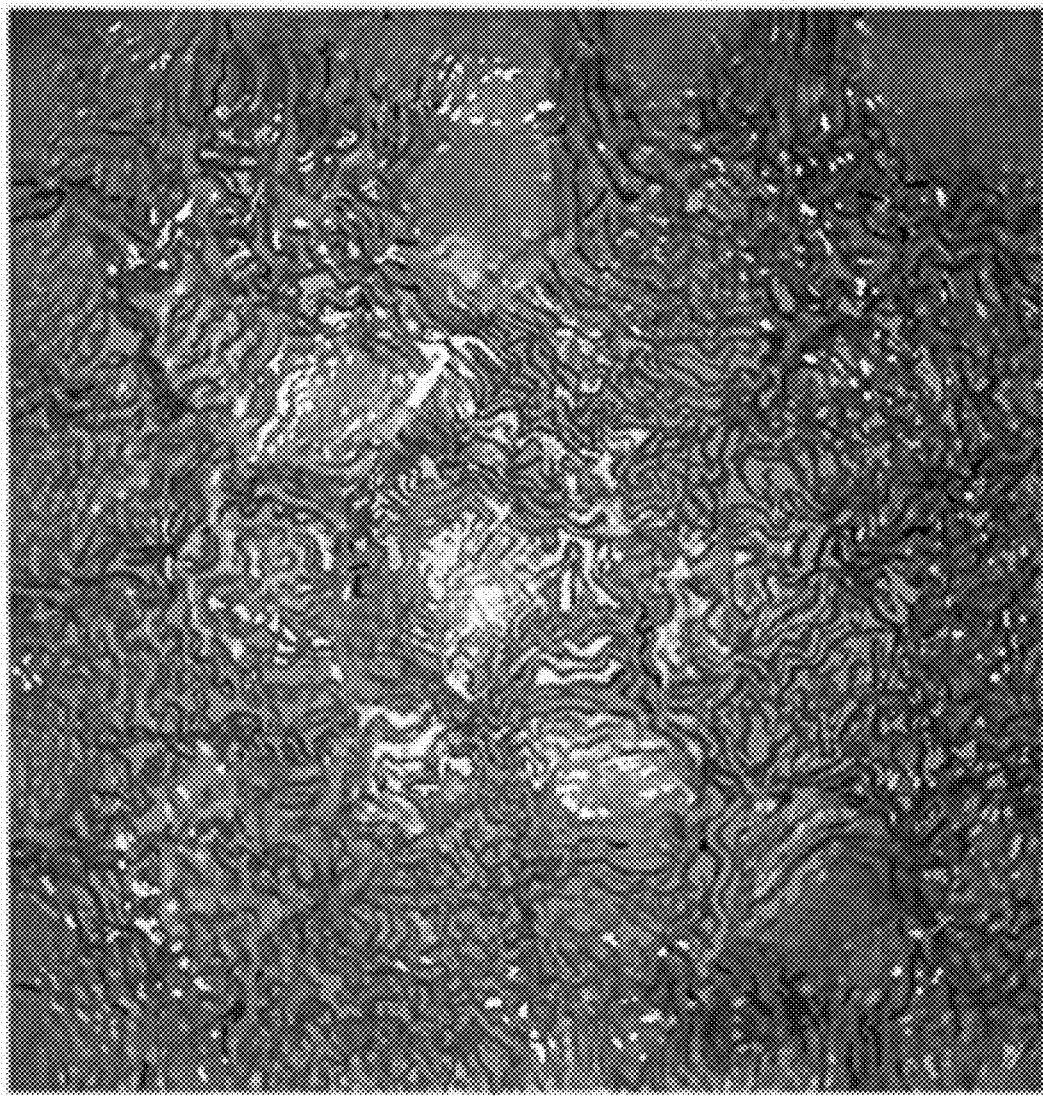
FIG. 4 is a photograph of a warped anode in an electrochemical cell stack.

As described herein, various embodiments of clamping devices 200 can reduce the amount of warping and deformation on the electrode or current collector foil by reducing/slowing the increase exerted by the first 210 and second 220 plates and/or by reducing the variation in the applied pressure due to the expansion of the cell stack 240. As can be seen in FIG. 4, the copper foil is wrinkled or deformed following cycling of the cell stack. The amount of wrinkle or deformation on the copper foil could be greatly minimized when the cell stack is cycled in the clamping device 200, as seen in FIG. 5. Furthermore, the clamping device 200 of certain embodiments can be left on the cell stack 240 substantially without affecting the cycle life of the cell stack 240. Certain embodiments have been tested on electrochemical cells containing silicon-based electrodes as well as graphite electrochemical cells.

Figure 6:
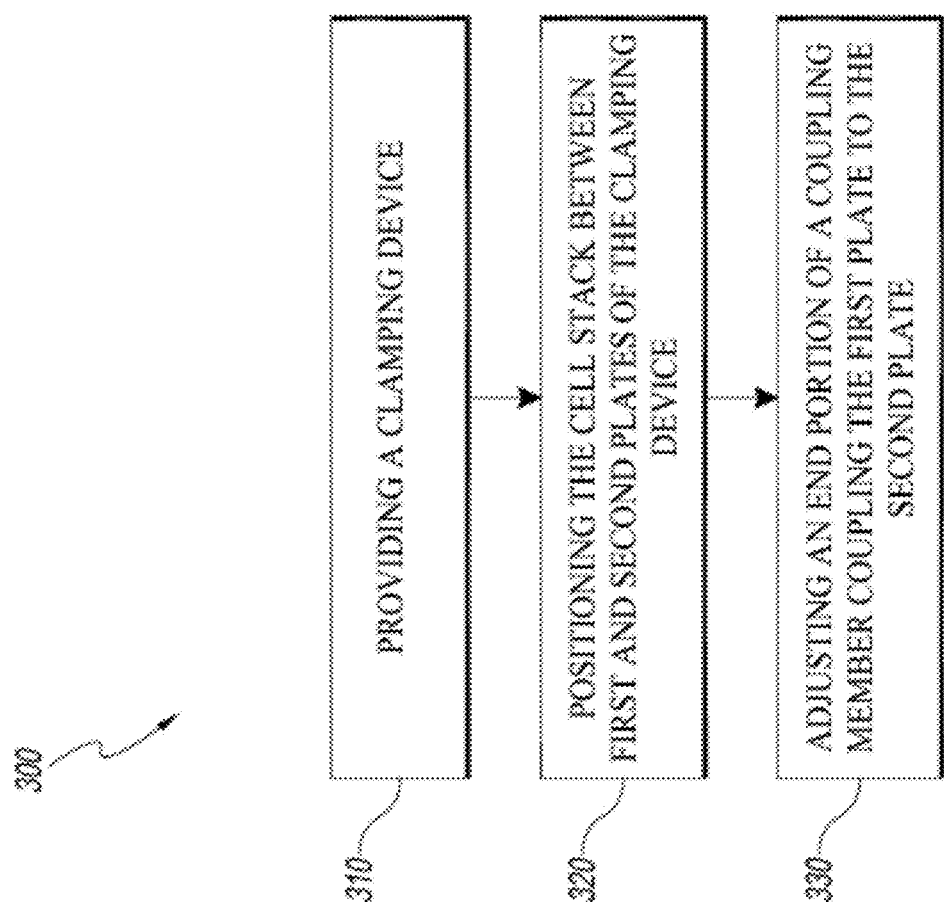
FIG. 6 illustrates an example method of reducing deformation of an electrode in an electrochemical cell stack.

FIG. 6 illustrates an example method of reducing deformation of an electrode or current collector in an electrochemical cell stack. In the example method 300, as shown in block 310, the method 300 can include providing a clamping device 200. The clamping device 200 can be the clamping device 200 as shown in FIGS. 1 and 2 and as described herein. The method 300 can also include positioning the electrochemical cell stack 240 between the first 210 and second 220 plates. Furthermore, the method 300 can include adjusting the end portion 255 of the coupling member 250 to set an applied pressure on the electrochemical cell stack 240. As an example, the applied pressure on the electrochemical cell stack 240 can be set to help compensate for the non-uniform thickness variation during charging of the cell stack 240. As a result, the amount of warping and deformation of the current collector can be reduced. See, e.g., FIG. 5.

In some methods, the timing of the use of the clamping device 200 can be important. For example, in order to reduce electrode or current collector foil deformation, the cell stack 240 may be clamped before the first charge occurs (e.g., also known as formation charge). If the clamping device 200 is used for the first time after the first formation charge occurs, the current collector foil may irreversibly deform (e.g., may be unable to return to its original geometry). Thus, in certain embodiments, the method 300 can further include positioning the cell stack 240 between the first 210 and second 220 plates prior to charging the cell stack 240 for the first time.

Cell formation occurs when the cell is treated after building the cell (e.g., to help the cell perform well throughout its life). Many times, cell formation can refer to the first charge of a cell. In some instances, the cell formation procedure can be more complicated. For example, cell formation can include charging of the cell at a rate of C/20, cycling the cell three times by charging at the rate of C/2, holding the voltage at the charge voltage (e.g., 4.2V) until the current drops to C/20, and then discharging at the rate of C/5. These types of procedures can be done while the cell is clamped with certain embodiments described herein. For pouch or can cells with a good polymer adhesion technology, the clamping device can be removed after the pretreatment of the cell is finalized. For pouch or can cells without sufficient polymer adhesion technology, the clamping device can remain on the cell, e.g, the applied pressure could be the same as during the pre-treatment or can be reduced. Other cell pre-treatment conditions that may be used before removing the clamping device includes treatments to the cell that include heating, pressing, and or heating and pressing.

In some embodiments, positioning the cell stack 240 between the first 210 and second 220 plates can include positioning a cell stack 240 that includes an electrode having silicon. In other embodiments, positioning the cell stack 240 between the first 210 and second 220 plates can include positioning a cell stack 240 that includes an electrode having graphite. Additionally, it is possible to include more than one cell stack 240 per clamping device 200. For example, more than one cell stack 240 can be placed side by side or in multiple layers, as long as the pressure on the cell stacks 240 can be maintained. Thus, positioning the cell stack 240 between the first 210 and second 220 plates can include positioning a second cell stack between the first 210 and second 220 plates.

Various embodiments have been described above. Although the invention has been described with reference to these specific embodiments, the descriptions are intended to be illustrative and are not intended to be limiting. Various modifications and applications may occur to those skilled in the art without departing from the true spirit and scope of the invention as defined in the appended claims.

What is claimed is:

1. A method of forming a battery, the method comprising:
providing a clamping device;
positioning the battery between first and second plates of the clamping device;
adjusting one or more coupling members coupling the first and second plates of the clamping device;
allowing one or both of the first and second plates to move away from the other plate upon expansion of the battery; and
removing the clamping device from the battery after cell formation or cell pretreatment.

2. The method of claim 1, further comprising charging the battery.

3. The method of claim 1, wherein the battery is positioned between the first and second plates prior to charging the battery for the first time.

4. The method of claim 1, wherein positioning the battery comprises positioning a second battery between the first and second plates.

5. The method of claim 1, further comprising providing an interfacial material between the battery and at least one of the first and second plates.

6. The method of claim 5, wherein the interfacial material is configured to conform to a surface of the battery.

7. The method of claim 1, wherein the plates provide an applied pressure on the battery that is between about 10 psi and about 400 psi.

8. The method of claim 7, wherein the plates provide an applied pressure on the battery that is between about 40 psi and about 300 psi.

9. The method of claim 8, wherein the plates provide an applied pressure on the battery that is between about 90 psi and about 300 psi.

10. The method of claim 9, wherein the plates provide an applied pressure on the battery that is between about 100 psi and about 200 psi.

11. The method of claim 1, wherein the battery comprises an anode comprising silicon.

12. The method of claim 1, wherein the battery comprises an anode comprising graphite.

13. The method of claim 1, wherein the battery is a lithium ion battery.

* * * * *